E. O. BENJAMIN.
CLOSURE AND TAP FOR TANKS, &c.
APPLICATION FILED JUNE 15, 1918.
1,328,980.
Patented Jan. 27, 1920.
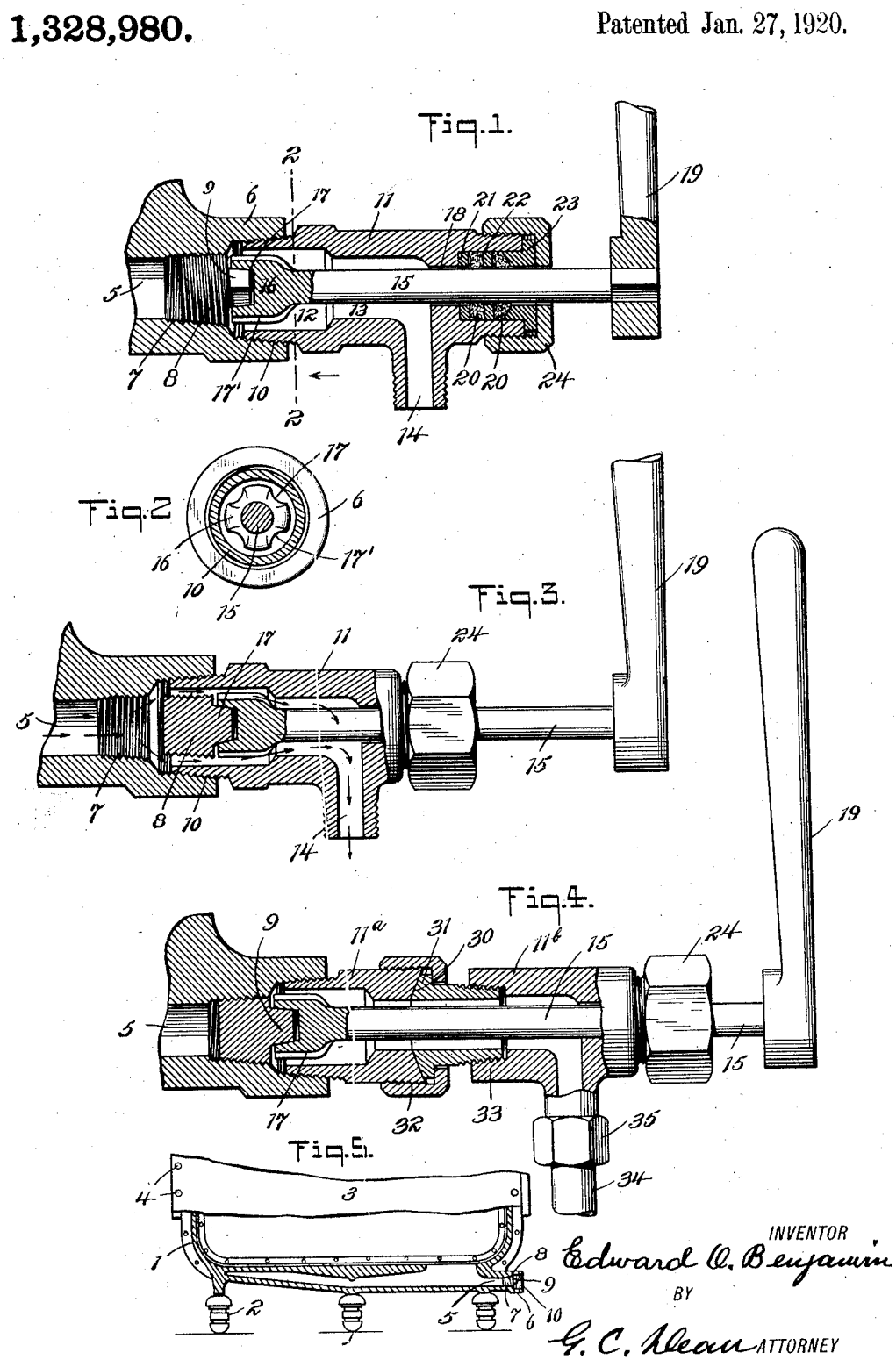
INVENTOR
Edward O. Benjamin
BY
G. C. Dean ATTORNEY

UNITED STATES PATENT OFFICE.

EDWARD O. BENJAMIN, OF NEWARK, NEW JERSEY.

CLOSURE AND TAP FOR TANKS, &c.

1,328,980.        Specification of Letters Patent.      Patented Jan. 27, 1920.

Application filed June 15, 1918. Serial No. 240,113.

*To all whom it may concern:*

Be it known that I, EDWARD O. BENJAMIN, a citizen of the United States, and resident of Newark, in the county of Essex and State of New Jersey, have invented certain new and useful Improvements in Closures and Taps for Tanks, &c., of which the following is a specification.

My present invention is shown herein as applied to the drain outlet of an electrolytic tank or cell of the type shown in my prior application, Serial No. 183,828, filed August 1st, 1917. It is particularly adapted for use in such connection because the liquid employed in the cell is usually a solution of potash soda or other corrosive liquid. Moreover, the tanks as usually employed stand on the floor close together in rows with aisles between and the drains when useful at all, are almost indispensable. While peculiarly adapted for the above mentioned specific purpose, my invention may be applied to any desired liquid container or tank and will be found particularly useful for use in connection with corrosive liquids.

The purpose of my invention is to provide the drain outlet passage with a simple, solid, all-metal closure not containing any rubber, leather, fiber or other yielding material or material that can be destructively acted upon by the liquid. The closure which I have selected as answering this purpose is a tapered screw plug employed in connection with an internal taper screw-thread for the outlet passage. The internal screw-threaded passage is of such depth and dimensions that the screw plug may be screwed therein until stopped solely by the increasing tightness of its fit in the converging taper passage, as distinguished from other screw plug arrangements wherein the plug is screwed inward against a circumferential flange or ledge. The plug is formed at its outer end with a relatively massive stud adapted for engagement by a socket wrench for applying any degree of force necessary to screw the plug into the taper to a point where it will have an absolutely water-tight cone fit in the taper passage.

Such cone plug I employ as the valve member of a detachable tap, the latter being preferably formed without any other cock or tap. This tap consists essentially of an elbow pipe or equivalent casting having an elbow passage. This pipe or casting has its inlet end and inlet passage made of materially greater cross-sectional area than the above described taper plug and is formed with an exterior screw thread adapted to fit a screw threaded enlargement of the outlet opening. These screw-threads are preferably taper-cut as in the case of the plug so as to give a water-tight joint without the use of washers or packing. Within the inlet passage is an axially movable and rotatable member extending through suitable packing to the exterior where it is provided with a suitable operating handle or lever. This rotatable member which may correspond in form and arrangement to the operating cock of an ordinary faucet, is formed at its inner end, not as a cock or valve, but as a wrench adapted to engage the square stud on the taper screw plug for the purpose of unscrewing, withdrawing, re-inserting and screwing up the said plug to any required degree.

The plug thus serves a double function. Under ordinary conditions when the wrench tap is removed, the plug remains as a permanent, reliable, water-tight closure for the drain opening but on those rare occasions when removal of the liquid is desired, and the tap wrench member is applied, the plug becomes the regulable valve element of the tap, whereby starting, stopping or graduating the rate of flow of the liquid is effected.

The above combination has many advantages. One wrench tap may be used for an entire plant. The tap is exposed to the liquid only during the time it is in use. When not in use, it may be easily and quickly removed and cleaned. The only packing material employed is in the tap where it is not easily reached by the liquid and where it can be easily renewed whenever necessary. The tank outlet passage may be as short as desired and wholly within the line of the tank structure. The screw-threads are internal threads and hence not likely to be damaged during the long periods of non-use of the tap.

The nature and objects of my invention may be more fully understood from the following description in connection with the accompanying drawings, in which—

Figure 1 is a longitudinal section showing my invention as applied to a tank outlet with the parts in the closed position;

Fig. 2 is a transverse section on the line 2—2, Fig. 1;

Fig. 3, is a view like Fig. 1 but showing the plug removed for drainage of the liquid;

Fig. 4 is a similar view but showing a modification in which the tap is provided with a swivel joint for turning the discharge outlet in any desired direction; and Fig. 5 is a vertical section showing my invention and its relation to a tank or electrolytic cell of the construction shown in my prior application above referred to.

For present purposes, it is unnecessary to refer to construction of said tank further than to note that it comprises a thin rectangular frame 1, preferably of cast iron, mounted on suitable supports 2, preferably insulators, and closed in by plates 3 secured to the frame by bolts 4. In the bottom of the frame is the drain passage 5 terminating in a projecting boss 6, extending laterally a distance sufficient to bring the outer end of the outlet just within the vertical line of the tank structure.

The permanent closing means includes the internal taper screw-thread 7, into which is tightly screwed the similarly taper screw-threaded plug 8 formed with the square lug 9. The outer end of the boss is formed with a similarly taper internal screw-thread 10 of considerably greater diameter than the thread 7. Between these two screw threaded portions 7 and 10 is an intermediate conical connecting surface from the larger end of the taper screw thread 7 to the smaller end of the taper screw thread 10. In the insertion of the plug this conical surface tends to guide the plug into the taper screw thread 7 if the plug is not firmly centrally supported by the operating handle or wrench stem hereinafter referred to.

As shown in the drawings, the wrench tap comprises a casting 11 formed with an elbow passage, the entrance portion 12 of which is of diameter sufficient to receive the screw plug when the latter is withdrawn, the intermediate portion 13 being of so much smaller diameter and the outlet 14 of still less diameter. The cross-sections of the various parts of the passage are varied so that the annulus for passage of liquid around the plug and wrench in part 12 and the wrench stem in part 13, will be at least as great as that of the unobstructed portion 14.

Within the tap is the wrench stem 15, enlarged at 16 and provided at the end with the wrench socket 17, adapted to fit the squared lug 9. Preferably, the exterior of the wrench socket is grooved or fluted as at 17, Fig. 2, with a view to affording increased facility for passage of the liquid. The stem 15 extends through the opening 18 and is provided at the end with a handle or lever 19. Escape of liquid through the opening 18 is prevented by suitable packing which may be inclosed in a stuffing box of any desired construction. As shown in the drawings, the packing material is arranged in two annular layers 20, 20, clamped between washers 21, 22 and a follower 23 forced inward by screw cap 24. The tap and wrench may be of any desired material, which may be iron where alkaline liquids are employed, or which may be nickeled, tinned, enameled or otherwise provided with protection suitable to the nature of the liquid.

In Fig. 4, the parts in their relative arrangement are substantially the same as above described, except that the horizontally extending portion of the tap conduit has a swivel inserted therein. As shown in the drawings, this construction may comprise a swivel seat 30 on the tap section 11$^a$, a flanged swivel head 31 adapted to fit the same and a flange screw collar 32 adapted to force said head against said seat. The engaging surfaces of the seat and head are perfectly conical. The swivel head 31 is secured to the section 11$^b$ of the tap, preferably by taper screw-thread 23.

Fig. 4 also shows how a pipe 34 may be rigidly secured to the screw-threaded outlet of the tap by means of a screw sleeve 35.

The method of operation of my device will be readily understood from the foregoing description in connection with the drawing. Under ordinary conditions, the tank or electrolytic cell has its drain outlet closed by the taper plug 8 which may be screwed tight therein by applying any degree of force which the screw threads can stand without stripping. If the plug and the tank are of iron and the plug is screwed in tightly enough, the plug may be kept filled with potash or soda solution for long periods of time, even a year or more without any possible danger of leak and also without danger of becoming broken or displaced because there are no projecting parts, and the screw threads are internal.

When it is desired to drain the tank or to draw off any part of its contents, the tap is screwed tightly into the taper thread 10, the wrench socket is pushed inward and manipulated to fit over the squared lug 9. The plug 8 may then be unscrewed by turning the handle 19, either partially to permit a graduated escape of the liquid, or it may be wholly withdrawn to position shown in Fig. 3 to permit maximum flow of the liquid.

While I have shown and described with considerable particularity a desirable embodiment of my invention, as well as the relations in which it may be desirably employed, it will be obvious that various modifications, additions and omissions of parts and their dimensions and relative arrangement may be made without departure from the spirit of my invention.

I claim:

A liquid container discharge conduit formed with an internal taper screw thread, an enlarged outlet having an internal taper screw thread of greater cross section than said discharge conduit and a conical portion connecting the larger end of said conduit screw thread and the smaller end of said outlet screw thread, in combination with a closure and tap therefor comprising an imperforate taper plug adapted to fit said first mentioned screw thread and formed at its outer end for engagement by a wrench and a tap externally taper-threaded to fit said outlet screw thread and formed with a longitudinal passage of larger diameter than said conduit screw thread and with a lateral outlet, a water tight packing at the outer end of said passage, and a wrench extending through said passage and having a cylindrical portion for rotary and longitudinal sliding engagement with the water tight packing and provided at its inner end with a wrench head for a non-rotary engagement with the outer end of said plug whereby said plug may be withdrawn completely into said passage leaving an annular fluid escape passage around the same, said conical connecting portion serving to guide said plug to said conduit screw threads upon the return movement of said plug.

Signed at New York city, in the county of New York, and State of New York, this 12th day of June, A. D. 1918.

EDWARD O. BENJAMIN.